United States Patent
Lawwill et al.

[11] Patent Number: 6,076,845
[45] Date of Patent: Jun. 20, 2000

[54] REAR SUSPENSION FOR A BICYCLE HAVING A FLEXIBLE CHAIN STAY

[75] Inventors: Merton R. Lawwill, Tiburon, Calif.; Mark L. Schroeder, Boulder, Colo.

[73] Assignee: Schwinn Cycling & Fitness Inc., Boulder, Colo.

[21] Appl. No.: 09/160,001

[22] Filed: Sep. 24, 1998

[51] Int. Cl.$^7$ .................................................. B62K 25/30
[52] U.S. Cl. ............................................................ 280/284
[58] Field of Search .................................. 280/275, 276, 280/283, 284, 285, 286

[56] References Cited

U.S. PATENT DOCUMENTS

| | | |
|---|---|---|
| D. 368,678 | 4/1996 | Wilcox et al. . |
| 452,073 | 5/1891 | Huelsen et al. . |
| 644,788 | 3/1900 | Williams . |
| 707,262 | 8/1902 | Sager et al. . |
| 709,718 | 9/1902 | Monahan . |
| 1,029,771 | 6/1912 | Stephenson .............................. 280/284 |
| 1,261,440 | 4/1918 | Rigby ....................................... 280/284 |
| 3,917,313 | 11/1975 | Smith et al. . |
| 3,982,770 | 9/1976 | Satoh et al. . |
| 4,058,181 | 11/1977 | Buell . |
| 4,114,918 | 9/1978 | Lutz . |
| 4,789,174 | 12/1988 | Lawwill . |
| 5,098,114 | 3/1992 | Jones . |
| 5,121,937 | 6/1992 | Lawwill . |
| 5,205,572 | 4/1993 | Buell et al. . |
| 5,217,241 | 6/1993 | Girvin . |
| 5,226,674 | 7/1993 | Buell et al. . |
| 5,244,224 | 9/1993 | Busby . |
| 5,259,637 | 11/1993 | Busby . |
| 5,301,974 | 4/1994 | Knapp . |
| 5,306,036 | 4/1994 | Busby . |
| 5,316,327 | 5/1994 | Bell . |
| 5,332,246 | 7/1994 | Buell . |
| 5,335,929 | 8/1994 | Takagaki et al. . |
| 5,354,085 | 10/1994 | Gally . |
| 5,409,249 | 4/1995 | Busby . |
| 5,413,368 | 5/1995 | Pong et al. . |
| 5,452,910 | 9/1995 | Harris . |
| 5,509,679 | 4/1996 | Leitner . |
| 5,553,881 | 9/1996 | Klassen et al. . |
| 5,628,524 | 5/1997 | Klassen et al. . |
| 5,957,473 | 9/1999 | Lawwill ................................... 280/284 |
| 5,975,550 | 11/1999 | Schonfeld ................................ 280/284 |

FOREIGN PATENT DOCUMENTS

| | | |
|---|---|---|
| 753260 | 10/1933 | France . |
| 884138 | 8/1943 | France . |
| 996586 | 12/1951 | France . |

*Primary Examiner*—Kevin Hurley
*Attorney, Agent, or Firm*—Holland & Hart LLP

[57] ABSTRACT

A rear suspension bicycle having a rear wheel with an axle, a frame including a seat tube and a down tube having a top and bottom ends, a pair of drop link members, one for either side of the rear wheel, each having a top attachment point and a bottom attachment point, and an axle attachment point for receiving the axle. A seat stay assembly including a front end and a rear end, and having a front pivotal attachment point adjacent the front end for attachment to the down tube defining a first pivot point, and a pair of rear pivot points, each for pivotal attachment to the top attachment point of one of said drop link members, forming together the second pivot point. A vertically flexible chain stay assembly, providing suspension spring force, having a front end and a rear end, and defining a front fixed attachment point at the front end, and a pair of rear pivot points at the rear end, the front attachment point being adjacent to the bottom end of the seat tube, and a pair of rear pivot points, each for pivotal attachment to the bottom attachment point of one of the drop link members, forming together the third pivot point. A damping member is mounted between the seat stay assembly and the frame. When the rear wheel is moved upwardly with respect to the frame, the chain stay assembly flexes upwardly, and the axle traces a complex curvilinear axle path generally upwardly, moving first rearwardly to a rearwardmost position, then forwardly along the upward axle path. The rear suspension transmits the pedal force generated by the rider efficiently into forward moving force without compressing, or otherwise activating, the suspension appreciably.

13 Claims, 10 Drawing Sheets

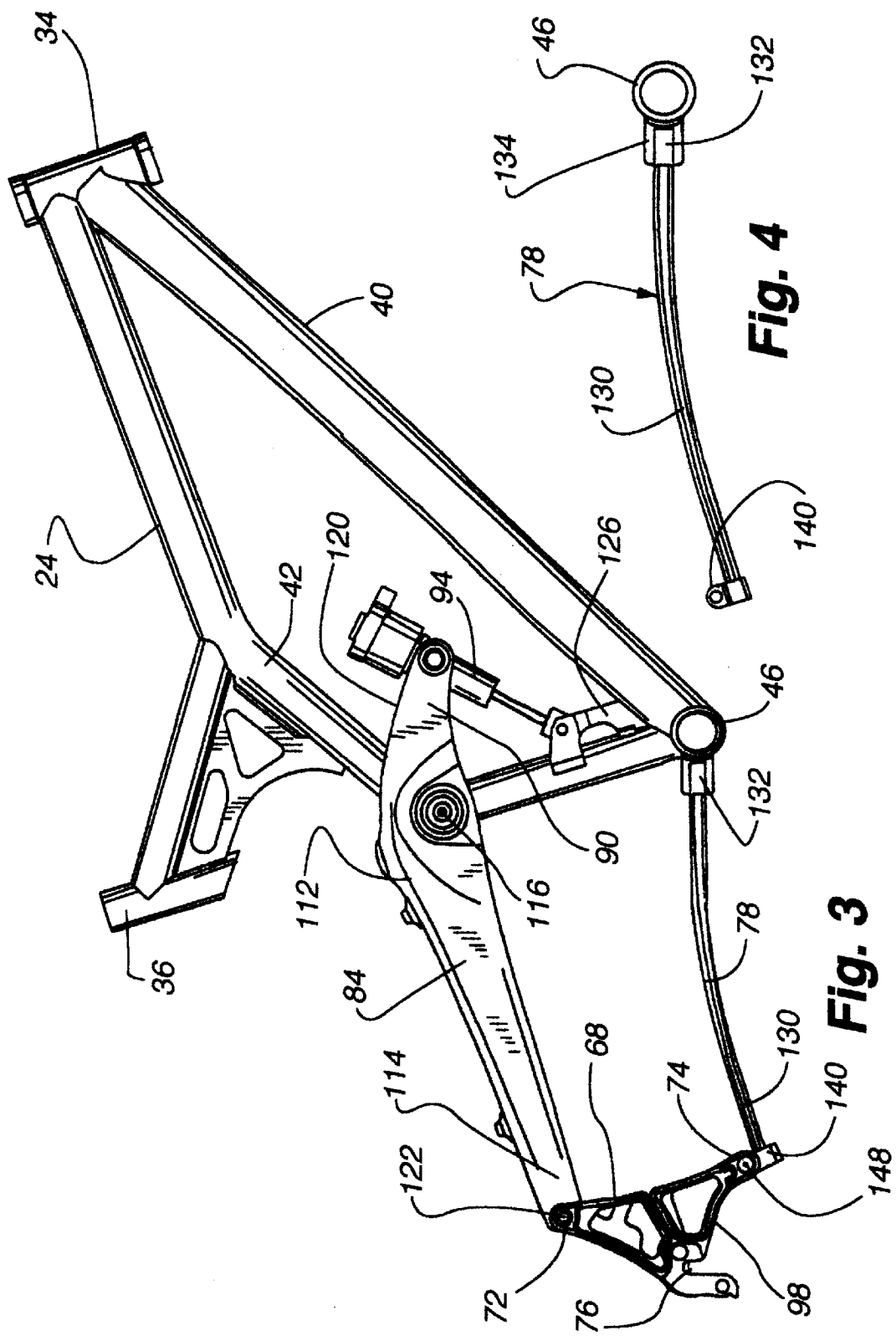

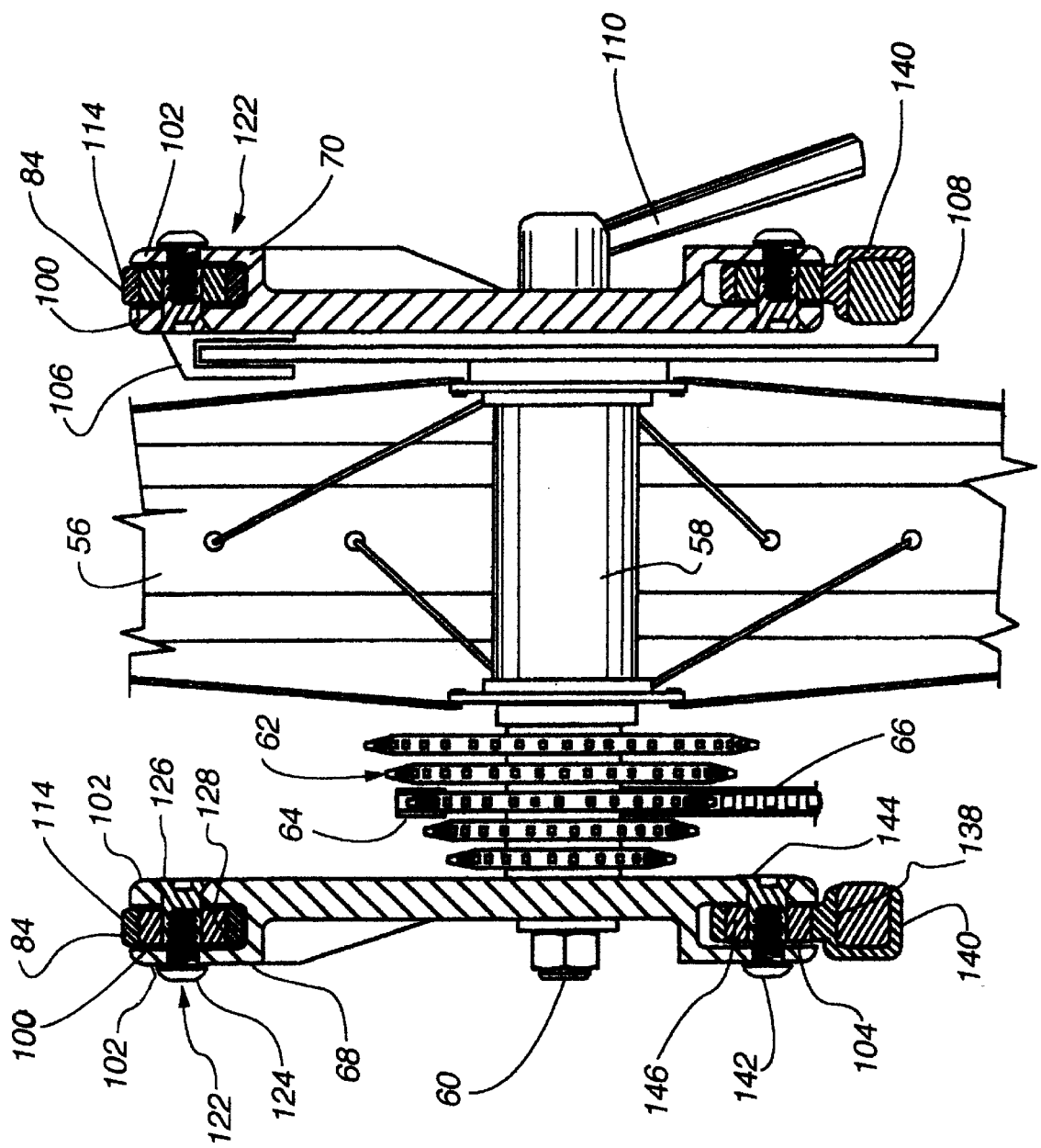

REAR SUSPENSION FOR A BICYCLE HAVING A FLEXIBLE CHAIN STAY

FIELD OF THE INVENTION

This invention relates to bicycles, and more particularly relates to a new and improved rear suspension for a bicycle.

BACKGROUND OF THE INVENTION

Bicycle suspensions have become popular because they allow riders to ride more comfortably over rough terrain, and with more control in difficult circumstances. Rear suspension systems are particularly important in improving comfort and safety, and have been developed to the point of allowing more than 6" of vertical suspension travel of the rear wheel. The onset of downhill mountain bike racing in the early 1990's prompted the design of rear suspensions having large amounts of suspension travel.

When the rear suspensions designed for downhill mountain bike racing are transferred to more general types of mountain bikes, the forward motive force generated by the rider through the drive train is partially used to activate the suspension system. The partial activation of the rear suspension reduces the efficiency with which the rider's pedaling energy is transmitted to the forward movement of the bicycle. While this phenomenon occurs in downhill style mountain bikes, it is not an important issue because of the particular downhill riding style. When the energy loss phenomenon occurs in a more general type of mountain bike, the resulting inefficiencies can drastically affect performance. In addition, the existing suspension systems are relatively heavy in order to provide the desired strength and performance.

There has been an increased interest to have active rear suspensions which provide a great deal of vertical travel, but that are more efficient in transferring the pedaling force of the rider to the forward movement of the bicycle without losing energy to compression of, or otherwise activate, the rear suspension. Bikes having these types of rear suspensions are considered all-around, cross country or free-ride type mountain bikes.

There is a continuing need in the art for an improved rear suspension which is more efficient in transferring the pedaling force of the rider to the forward movement of the bike, and to minimize the energy lost in compressing the rear suspension.

SUMMARY OF THE INVENTION

The present invention in general terms concerns a rear suspension system of a bicycle that efficiently transmits the pedal force to forward movement of the bicycle. The rear suspension system of the present invention overcomes many of the aforementioned problems. The rear suspension is energy-efficient, well balanced, and provides exceptional suspension travel, among other important advantages that are discussed below.

The invention generally includes a rear suspension bicycle having a rear wheel with an axle, a frame including a seat tube and a down tube having a top and bottom ends, a pair of drop link members, one for either side of the rear wheel, each having a top attachment point and a bottom attachment point, and an axle attachment point for receiving the axle. A seat stay assembly is also included, having a front end and a rear end, and having a front pivot point adjacent the front end for pivotal attachment to the seat tube defining a first pivot point, and a pair of rear pivot points, each for pivotal attachment to the top attachment point of one of said drop link members, forming together the second pivot point. A chain stay assembly is included, having a front end and a rear end, and defining a pair of pivot points at the rear end.

The front of the chain stay is fixedly attached adjacent to the bottom end of the seat tube, and the pair of rear pivot points, each for pivotal attachment to the bottom attachment point of one of the drop link members, forms together the third pivot point.

A damping element is mounted between the seat stay assembly and the frame.

Accordingly, it is the primary object of the present invention to provide a rear suspension system for a bicycle that balances the forces developed while pedaling to efficiently transmit the force to the forward movement of the bicycle.

It is another object of the present invention to provide a rear suspension system that effectively absorbs impact to the rear wheel.

It is yet another object of the present invention to provide a rear suspension system that is lighter than existing suspension systems.

Other aspects, features and details of the present invention can be more completely understood by reference to the following detailed description of a preferred embodiment, in conjunction with the drawings, and from the appended claims.

BRIEF DESCRIPTION OF THE DRAWINGS

FIG. 3 is a side elevation view of a bicycle frame including the flexible chain stay of the present invention.

FIG. 4 is a side elevation view of the flexible chain stay of the present invention.

FIG. 9 is a section taken along line 9—9 of FIG. 2.

DETAILED DESCRIPTION OF THE PREFERRED EMBODIMENT

Figure 1:
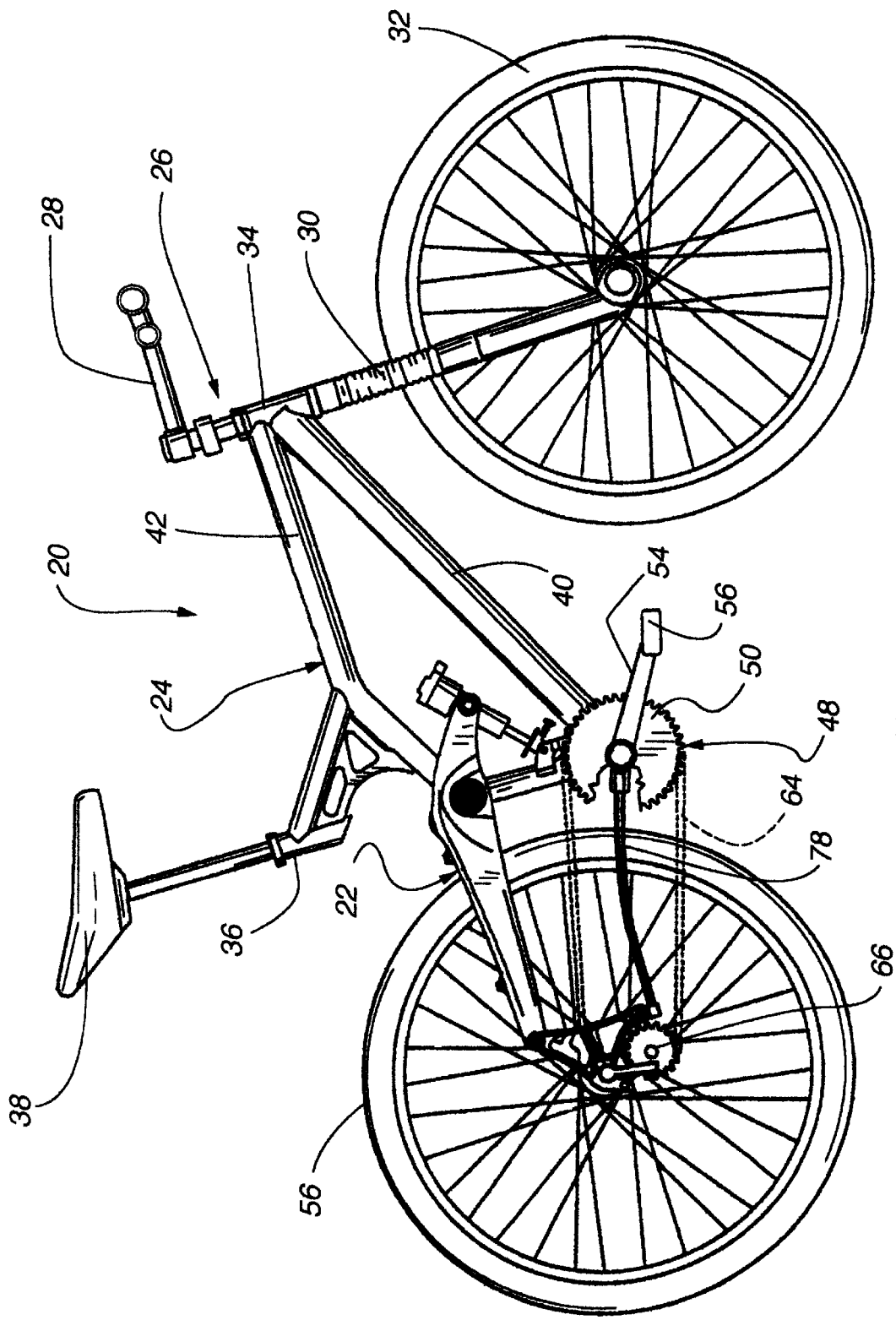
FIG. 1 is a side elevation view of a bicycle including the flexible chain stay of the present invention.

Referring to FIG. 1, a mountain bike 20 is shown which incorporates the rear suspension 22 of the present invention. The rear suspension 22 of the present invention can also be used on other types of bicycles, as well as motorcycles, but the preferred embodiment is described herein as used on a mountain bike. The mountain bike includes a frame 24 which rotatably supports a steering assembly 26. The steering assembly 26 includes a handle bar 28 and fork 30. The fork receives a front wheel 32 in a known manner, and also the handle bar, which allows the rider to steer the bicycle. The fork and handle bar are rotatably received in a head tube 34 at the front end of the frame 24.

Figure 2:
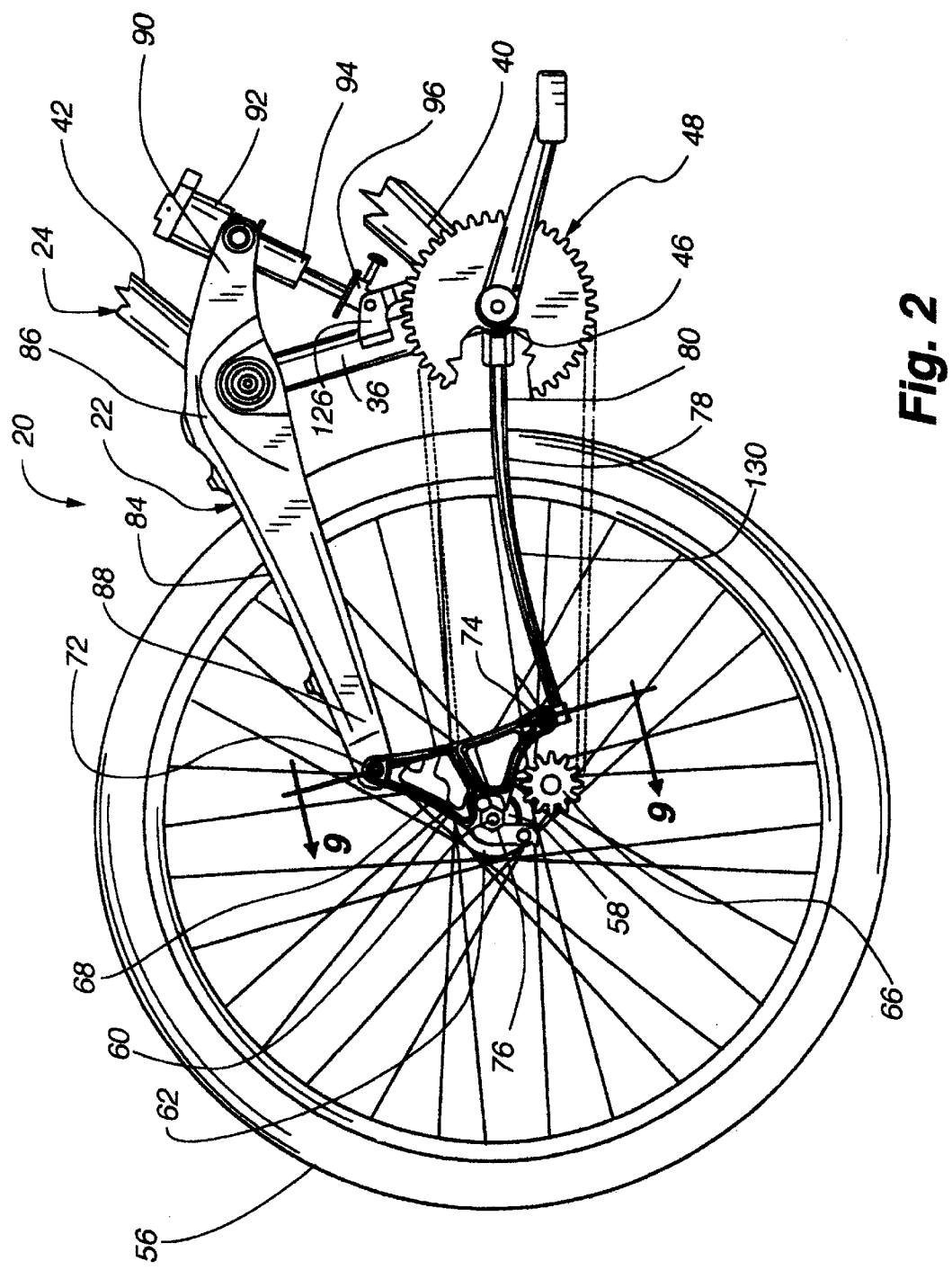
FIG. 2 is an enlarged side elevation view of a bicycle including the flexible chain stay of the present invention.
Figure 5:
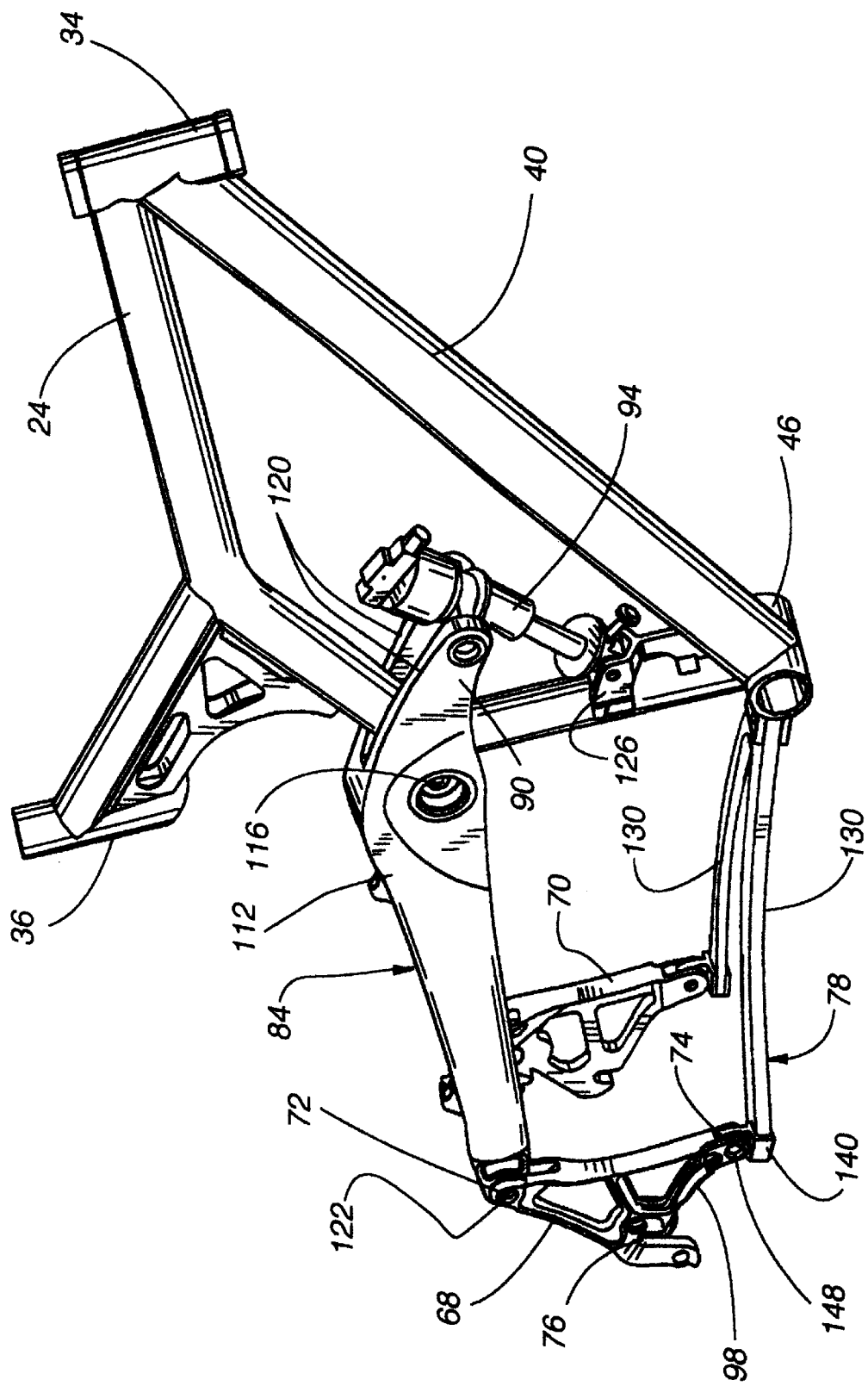
FIG. 5 is a front perspective view of a bicycle frame including the flexible chain stay.

Referring now to FIGS. 1 and 2, the bicycle frame 24 also includes a seat tube 36 for adjustably supporting a seat 38, and a down tube 40 extending from the head tube 34 to the bottom of the seat tube 36. The seat tube in some instances can be discontinuous, as shown here. A top tube 42 extends from the head tube 34 to substantially the top of the seat tube 36. In instances where the seat tube is discontinuous, the top tube may have a forked end 44, as shown herein. A bottom bracket 46 is attached to the frame 24 at the intersection of the seat tube 36 and the down tube 40, and rotatably supports the drive train 48. The drive train 48 includes the chain ring(s) 50, crank arms 52 and pedals 54, all in a known manner.

While the preferred embodiment of the invention is described herein in conjunction with a four-link rear suspension using drop links pivotally connecting the rear ends of the chain stay and seat stay together, it is contemplated that the flexible chain stay of the present invention can be used on many types of rear suspension systems for bicycles.

The rear suspension system 22 of the present invention is attached to the frame 24 and generally extends rearwardly from the seat tube 36. The rear suspension system 22 rotatably supports a rear wheel 56. The rear wheel 56 includes a hub 58 having an axle 60 and a gear set 62 extending from one side concentric to the axle 60. The rear suspension system 22 rotatably receives the axle 60 of the rear wheel 56 in a conventional manner. The drive train 48 is completed with the connection of the chain ring 50 to the gear set 62 by a chain 64, and includes a derailleur system 66 which is controlled by the user to change gears on the front chain ring 50 as well as on the rear gear set 62.

The rear suspension system 22 is made up of four links attached together in a certain configuration, as defined below, to allow the rear wheel 56 of the mountain bike to move in a substantially vertical direction to absorb the shock from impacting objects such as rocks, stumps or the like. The rear suspension system 22 includes a drop link assembly having one drop link 68, 70 for each side of the rear wheel 56 and hub 58, and each drop link includes a top 72 and bottom 74 attachment points, as well as an axle attachment point 76. A flexible chain stay assembly 78 attaches at a front end 80 to the bottom bracket 46, and at the rear end 82 pivotally to the bottom attachment point 74 on each of the drop links 68 and 70. A seat stay assembly 84 pivotally attaches to the seat tube 36 adjacent its front end 86, between a point midway up the seat tube 36 from the bottom bracket 46, and at its rear end 88 to the top attachment point 72 of each of the drop links 68, 70.

Figure 16:
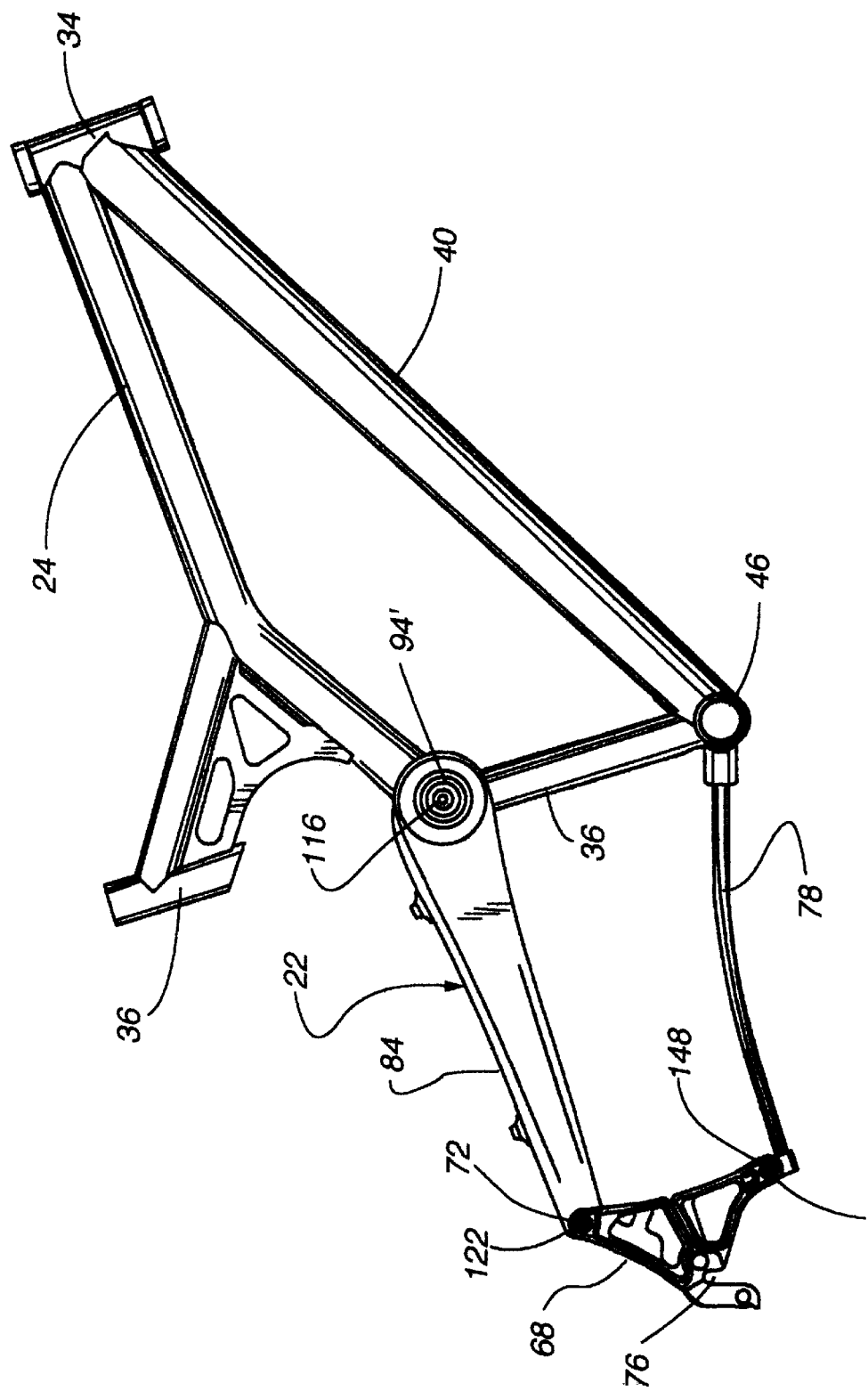
FIG. 16 is side elevation view of a bicycle frame where a rotary damper is used instead of a linear damper.

In the embodiment shown, a damper arm 90 extends forwardly from the seat stay 84 assembly to receive one end 92 of a damper assembly 94. The other end 96 of the damper assembly 94 is mounted to the frame 24, preferably adjacent to the bottom of the seat tube 36. It is contemplated that the damper 94 can be positioned elsewhere on the bicycle 20, such as between the seat stay 84 and the frame 24, between the chain stay 78 and the frame 24, or between the chain stay 78 and the seat stay 84. The damper 94 acts to absorb energy in compression and rebound of the suspension movement (see FIG. 10). The energy stored in the flexible chain stay 78 due to flexion upon compression of the rear suspension 22 provides the "rebound" effect to move the suspension 22 back to the uncompressed position (dash line in FIG. 10). A. suitable linear damper 94 is the Super Deluxe model available from Rockshox. Alternatively, as shown in FIG. 16, a rotary damper 94' can also be used at the intersection of the seat stay 84 and the seat tube 36 to replace the linear dampers mentioned above. The rotary damper, similar to those used on motorcycles, such as the Kayaba Rotary Damper sold on the Suzuki TL 1000 motorcycle, acts to damp the motion in the movement of the pivot point between the seat tube 36 and the seat stay 84.

The rear suspension assembly 22 is designed such that when the rider actuates the drive train by pedaling, which creates a force through the chain 64 on the rear suspension system, the rear suspension 22 does not appreciably compress or in other ways actuate, and thus efficiently transfers the rider's energy into forward movement of the bicycle 20. The combination flex-pivotal link system of the rear suspension system 22 inhibits the actuation of the suspension travel due to the forces; in the drive train 48 from pedaling, and thus efficiently transfers the pedaling force efficiently to the forward motion of the bicycle. This force balancing is created by the location of the pivots in the rear suspension 22.

However, when the rear wheel 56 impacts an object, the combination flex-pivot system of the rear suspension system 22 allows the rear wheel 56 to move in a substantially upward direction. The force of the impact is partially absorbed by actuating the damping member 94 through the movement of the damping arm 90, and by the flexible chain stay assembly. The flexible chain stay returns the rear wheel to the pre-impact position.

Referring to FIGS. 2, 3, 4, and 6, one drop link 68 or 70 is positioned on either side of the rear wheel 56, and each one is a substantial mirror image of the other. Each drop link 68 or 70 has a substantially triangular shape, with the top attachment point 72, bottom attachment point 74, and axle attachment point 76 forming the three points of the triangle. Preferably, the top attachment point 72 is approximately 4.125 inches from the axle attachment point 76, and the bottom attachment point 74 is approximately 3.4 inches from the axle attachment point 76. The line between the axle attachment point 76 and the top attachment point 72, and the line between the axle attachment point 76 and the bottom attachment point 74 form an angle of approximately 83°.

The triangular shape of each drop link 68, 70 makes them very strong and rigid, which allows them to efficiently transfer any movement or force to the other members of the rear suspension system 22 to which each drop link is attached. Each drop link 68, 70 can be a solid piece of plate metal, or can have apertures formed therethrough for weight saving. Suitable materials for making the drop links include forged or extruded aluminum, magnesium, or carbon composite.

While it is preferred that the drop links 68, 70 used in the present invention are as described above, it is contemplated that the drop links could be of any shape or pivot location and still provide the beneficial effects of the flexible chain stay 78 of the present invention. The drop links 68, 70 could have a substantially linear alignment of the pivot points, be curvilinear in shape, or extend up the seat stay 84 toward the seat tube 38, or along the flexible chain stay 78 toward the seat tube 36.

As described in more detail below, with respect to the preferred triangular-shaped drop link 68, 70, each drop link is oriented in the non-compressed stage such that the top attachment point 72 is upwardly and forwardly from the axle attachment point 76, and the bottom attachment point 74 is forwardly and downwardly positioned from the axle attachment point 76, and the bottom attachment point 74 is forwardly and downwardly positioned from the top attachment point 72. The axle attachment point 76 defines a downwardly opening recess for receiving an end of the axle 60 in a conventional manner. The side 98 of the drop link 68 between the axle attachment point 76 and the bottom attachment point 74 forms an inwardly directed curve to allow the derailleur 66 to freely move as required to change gears and rotate to take up chain slack.

Figure 11:
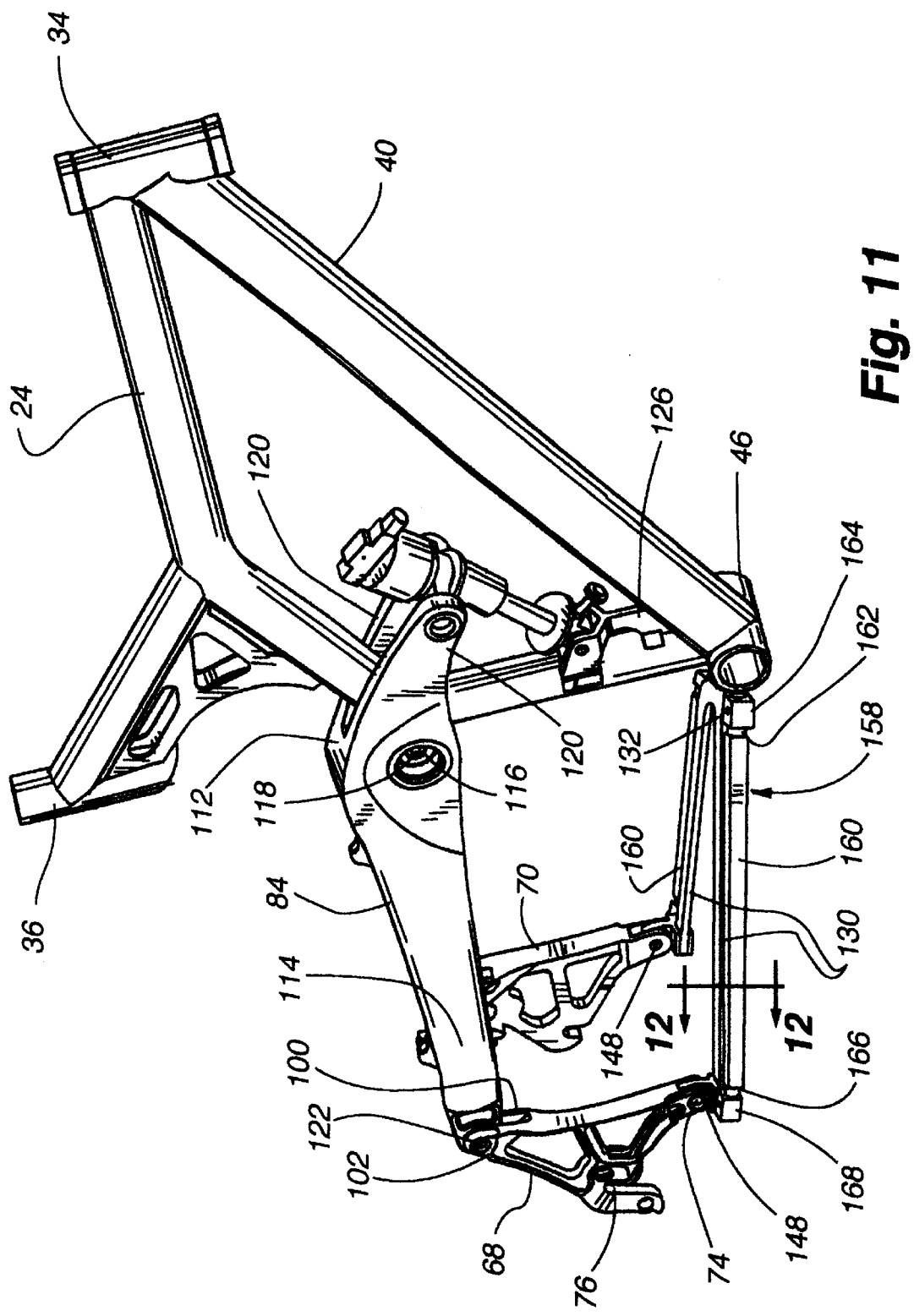
FIG. 11 is a front perspective view of a bicycle frame having a flexible chain stay with an adjustment mechanism attached thereto.

As shown in FIGS. 9 and 11, the top attachment point 72 of the drop link includes a slot 100 defined by co-extending flanges 102 for receiving the seat stay assembly 84, as is described further below. An aperture is formed through both flanges 102 to allow a pivotal connection to be made pivotally with the seat stay assembly 84. The bottom attachment point 74 has a similar slot 104 to the top attachment point 72 for receiving the rear end of the chain stay assembly 84.

A disc brake caliper 106 is attached to the left side (per convention) drop link 70 to engage the disc 108 mounted to the left side (also per convention) of the hub 58 of the rear wheel. The disc brake caliper 106 is actuated in a normal fashion by a brake lever on the handlebars. The axle 60 of the rear wheel 56 is attached to the drop links 68, 70 in the axle attachment point 76 in a normal manner, such as by a quick release fastener 110.

As best seen in FIGS. 3 and 11, the seat stay assembly 84 defines a solid central portion 112 having a pair of legs 114 extending rearwardly from the central portion, each leg extending along the side of the rear wheel 56. The solid central portion 112 pivotally attaches to the seat tube 36 to form the first pivot point 116, such as by a rod and bearing 118 extending through an aperture in the central portion 112. This pivotal connection between the seat stay 84 and the seat tube 36 is in the range of approximately 5 inches to 12 inches above the rotational center of the bottom bracket 46. In the preferred embodiment, the first pivot 116 is 8.25 inches vertically above the center of the bottom bracket 36 and along the line from horizontal. An acceptable range is from 5–12 inches vertically above the bottom bracket 36, and 4 inches or less on either side of, and measured normal to, the line. A pair of legs 120 extend forwardly from the solid central portion 112 and extend around the sides of the seat tube 36 and form the damping arm.

As shown in FIG. 9, each of the distal ends of the rearwardly extending legs 114 is received in the top connection point 72 of one of the drop link 68 or 70. A second pivotal connection 122 is formed between the distal end of each of the legs 114 of the seat stay 84 assembly and the top attachment point 72 of the drop link 68, 70 by a screw 124 received in a pin 126, with the pin engaging a bearing 128 inserted in the aperture formed through the end of the leg.

The second pivot 122 is preferably 4.125 inches from the axle at an angle of 65° above the horizontal. The position of the second pivot 122 is related to the first pivot 116. The second pivot 122 can be horizontally in-line with the first pivot and displaced downwardly, up to the amount of the total suspension displacement, such as up to approximately 6 inches. If the second pivot 122 is much lower than the amount of suspension displacement from the first pivot 116, energy efficiency decreases. The fore/aft position of the second pivot 122 with respect to the first pivot 116 is not as important as its vertical relationship with the first pivot 116.

The two legs 120 that extend forwardly of the central solid portion 112 of the seat stay 84 define the damper arm. The ends of these legs 120 pivotally attach to a damping member 94 on either side of a top end 94 thereof The damping member 94 extends at an angle downwardly from the line between the first 116 and second pivot 122 points. As shown in FIGS. 2, 3 and 11, the damping member 94 is mounted preferably at an angle of approximately 60 degrees between the line defined between the first pivot point 116 and the pivot point at the end of the damping arm 90, and the line defined by the axis of the damping member 94 itself when at rest. This angle changes as the damping member 94 is actuated since the damping member 94 is pivotally mounted at its base to the bottom bracket 46 and rotates about that point when actuated. The effectiveness of the damping member 94 is controlled by the angle at which the damping arm 120 extends from the seat stay 84, the length of the damping arm 90, the type of damping member 94, and the attachment position of the bottom end 96 of the damping member 94.

Preferably, the damping arm 90 is pivotally attached to the top end 92 of the damping member 24, with the bottom end 96 of the damping member 94 attached to the seat tube 36 near the intersection of the seat tube 36 and the down tube 40, or to the bottom bracket 46. A bracket 126 can be attached to the seat tube 36 and supported on the down tube 40 to pivotally attach to the bottom end 96 of the damping member 94. A suitable damping member 94 is the Super Deluxe model available from the Rockshox company.

As will be described in greater detail below, when the rear ends of the seat stay 84 are moved in an upwardly direction, the damping arm 90 is forced in a downwardly direction, thus actuating the damping member 94. It is contemplated that the damping member 94 can be repositioned behind the seat tube 36 and activated off of the seat stay 84. Also, a pull-damper could be used with the appropriate structural modifications.

The seat stay 84 extends rearwardly and downwardly from the first pivot point 116 to the second pivot point 122. The seat stay 84 is preferably made of carbon/epoxy composite or aluminum, with each leg 114 of the seat stay 84 having a substantially rectangular cross section to minimize any flexure in the vertical or lateral direction along its length. The seat stay 84 is stiff in the vertical and horizontal directions to compensate for any independent flexure of the sides of the chain stay 78.

As noted above, the damper-arm 90 may not be required if the damping member is positioned elsewhere on the bicycle from. However, preferably, the seat stay 84 actuates the damping member 94.

Figure 8:
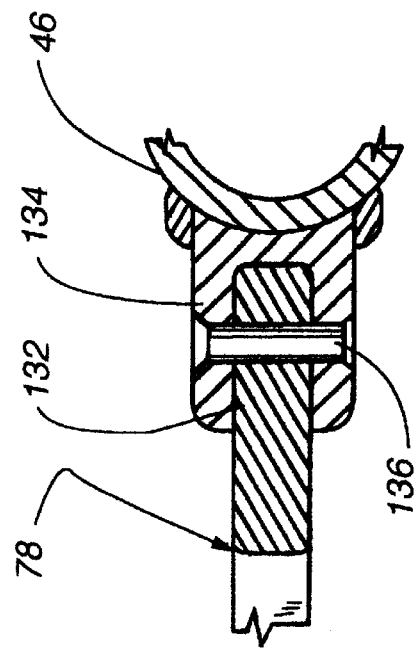
FIG. 8 is a section taken along line 8—8 of FIG. 7.

The chain stay assembly 78 is a substantially U-shaped member defining opposing legs 130 extending rearwardly from the base 132, or cross brace, of the U shape, one leg each for extending along each side of the rear wheel 56. The chain stay is preferably made of a carbon fiber epoxy composite. The chain stay 78 has a front end and a rear end, the front end defining the cross-brace for fixed attachment to the bottom bracket 46. The bottom bracket 46 defines rearwardly extending spaced flanges 134 for receiving the front portion of the cross-brace 132. The flanges 134 and cross-brace 132 are fixedly attached together by any known means, such as by bolts or rivets 136 passing through each flange 134 and the cross-brace 132, as shown in FIG. 8. The fasteners are preferably releasable or replaceable to allow the chain stay member 78 to be replaced. The cross-brace 32 provides torsional stiffness to the opposing legs 130 extending therefrom. The chain stay 78 is designed by the selection of the composite and structure (e.g. cross-sectional shape) to provide adequate lateral stiffness. The bottom bracket 46 can form a collar defining a recess for receiving the cross brace instead of preferred spaced flanges. The connection between the bottom bracket 46 and the front end of the chain stay creates the fixed anchor for the chain stay and its vertical spring action.

Each of the legs 130 of the chain stay 78 are preferably rectangular in cross section, being wider at the front end and can taper to a minimum dimension at the rear or opposing end. The thickness dimension does not change drastically from the front end to the rear end. The shape of the legs 130 can be any suitable shape providing sufficient vertical flexibility and lateral stability. The legs 130 also diverge as they extend from their front end to their rear end. The legs of the chain stay 78 are each vertically tunable springs (depending on carbon layup and/or structure), and can be tuned to make chain stays 78 of different vertical stiffness and thus amplitude of movement under a given force.

Figure 7:
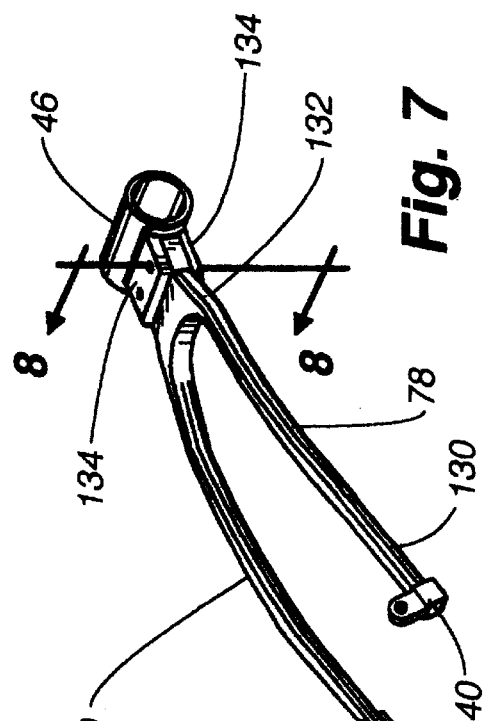
FIG. 7 is a rear perspective view of flexible chain stay.
Figure 6:
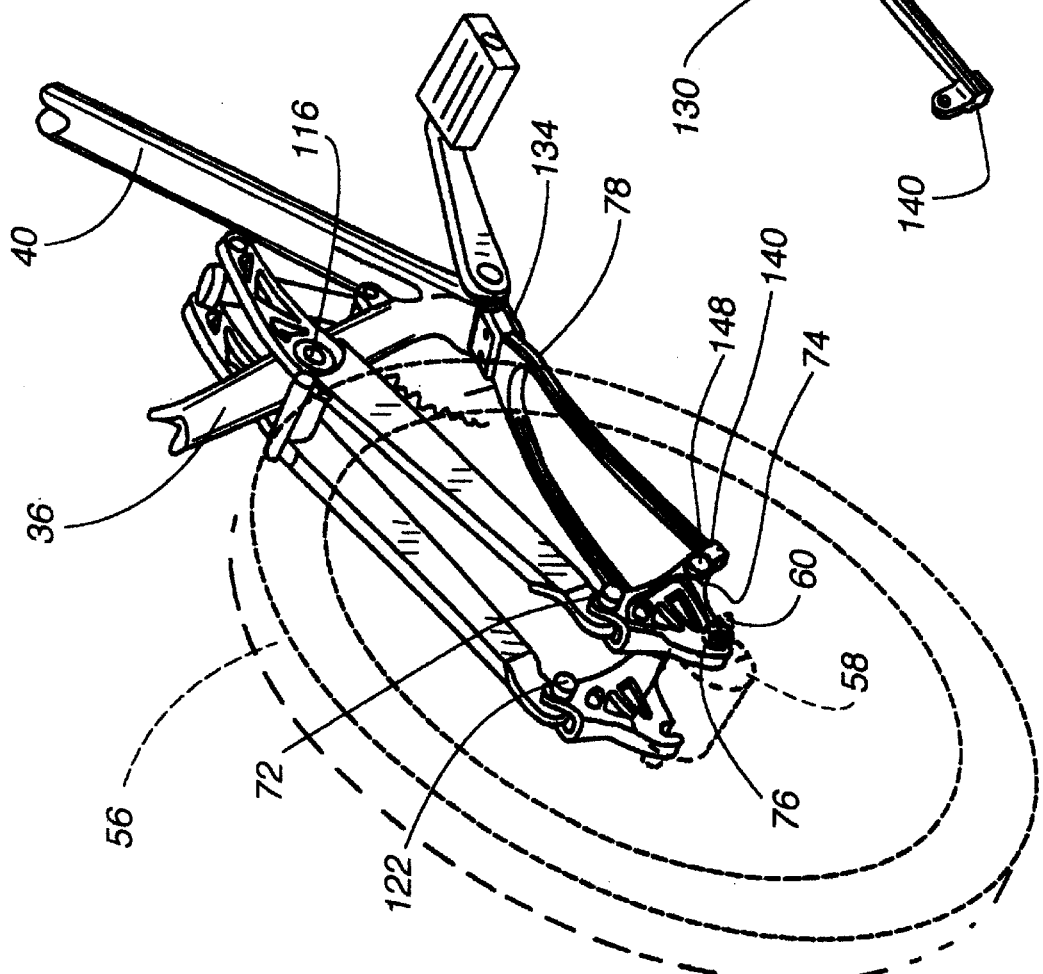
FIG. 6 is a rear perspective view of the rear suspension system.

As shown in FIGS. 6, 7 and 9, the rear end of each of the legs of the chain stay assembly 78 is positioned in a slot 138 formed in the chain stay end boss 140, or connector member. The chain stay end boss 140 is then attached to the bottom attachment point 74 of the particular drop link 68 or 70, and is preferably pivotally attached thereto in any known manner. One such manner is by a screw 142 received in a pin 144, with the pin engaging a bearing 146 inserted in the aperture formed through the end of the leg 130, as shown in FIG. 9. The chain stay end boss 140 defines the channel 138 for receiving the rear ends of the legs 130 of the chain stay 78. The slot 138 can open inwardly, as shown in FIG. 9, or outwardly. The chain stay end boss 140 can be co-molded onto the chain stay 78 when the chain stay is formed, or can be bonded to the composite with an epoxy adhesive. This provides for mechanical attachment of the chain stay end boss 140 to the chain stay legs 130.

The chain stay 78 is fixedly attached at the front end to the bottom bracket 46, and is pivotally attached to the drop link 68, 70. When the drop link 68 or 70 moves upwardly (typically both together), due to the wheel moving upwardly, the chain stay 78 flexes along its length. The front end of the chain stay is fixed and the rear end moves in a curvilinear path upwardly. As the chain stay 78 flexes, it becomes more stiff and its flex rate reduces to the point where the rear end stops moving upwardly. This terminal point is the top of the wheel travel. This vertical flexing of the chain stay 78 generates the spring force (reaction force) to move the suspension from the compressed position back to the uncompressed position (See FIG. 10). Again, the vertical stiffness of the chain stay 78 is adjustable depending on the carbon layup and physical dimensions of the chain stay 78.

Each of the extending legs 130 of the flexible chain stay are stabilized against torsion or independent flexing by the laterally rigid connection through the drop links 68 and 70 to the rigid seat stay 84.

Preferably, the bottom bracket 46 attaches to the front end of the chain stay 78 in a horizontal line drawn through the rotational center of the bottom bracket. The rotational center of the bottom bracket 46 is a convenient reference point, and is the center of rotation of the crank arms as supported in the bottom bracket.

The position of the attachment between the bottom bracket 46 and the front end of the chain stay 78 can range from directly above the bottom bracket by two inches to directly below the bottom bracket by two inches, or any position between along a rearward arc. Its position is limited to the rear by the rear tire, and forwardly by the bottom bracket and front derailleur position.

The third pivot 148 is the pivotal connection between the end of the chain stay 78 and the bottom attachment point 74 of the drop link 68 or 70. The proper position of the third pivot 148 is dependent upon the position of the chain stay attachment point 72. The third pivot 148 could be horizontally even with, or below the chain stay attachment point 72. The fore/aft position of the third pivot depends on the clearance with the rear derailleur. Other placement considerations include the particular spacing requirements preferred by the derailleur manufacturer, which can be modified to some extent without drastically affecting derailleur performance.

In the following discussion, reference will be made to the seat stay assembly 84, the chain stay assembly 78, and the drop links 68 and 70 in the singular, even though there is one such member or portion of such member on either side of the rear wheel. In addition, the different pivot points will be referred to in the singular even though there are two pivot point locations, one on either side of the rear wheel and frame.

As set forth above, the first pivot point 116 is defined as the pivot point formed between the seat stay 84 and the seat tube 36. The second pivot point 122 is defined as the pivot point formed between the seat stay 84 and the top attachment point 72 of the drop link 68. The third pivot point 148 is defined as the pivotal connection between the rear end of the chain stay 78 and the bottom attachment point 74 of the drop link 68.

The entire set of pivot locations and flexible chain stay is a complex relationship that composes the suspension system 22. Some important characteristics with respect to the rear suspension system include the axle path, leverage ratio, wheel rate, and energy efficiency. Each of the pivots and the flexible chain stay have a different degree to which they affect the performance of these characteristics.

Energy efficiency relates to the tendency of the suspension to compress, or otherwise actuate, due to the pedaling forces transmitted by the chain to the suspension system, which causes the suspension system to move, and thus use energy that could otherwise move the bike forward.

Figure 10:
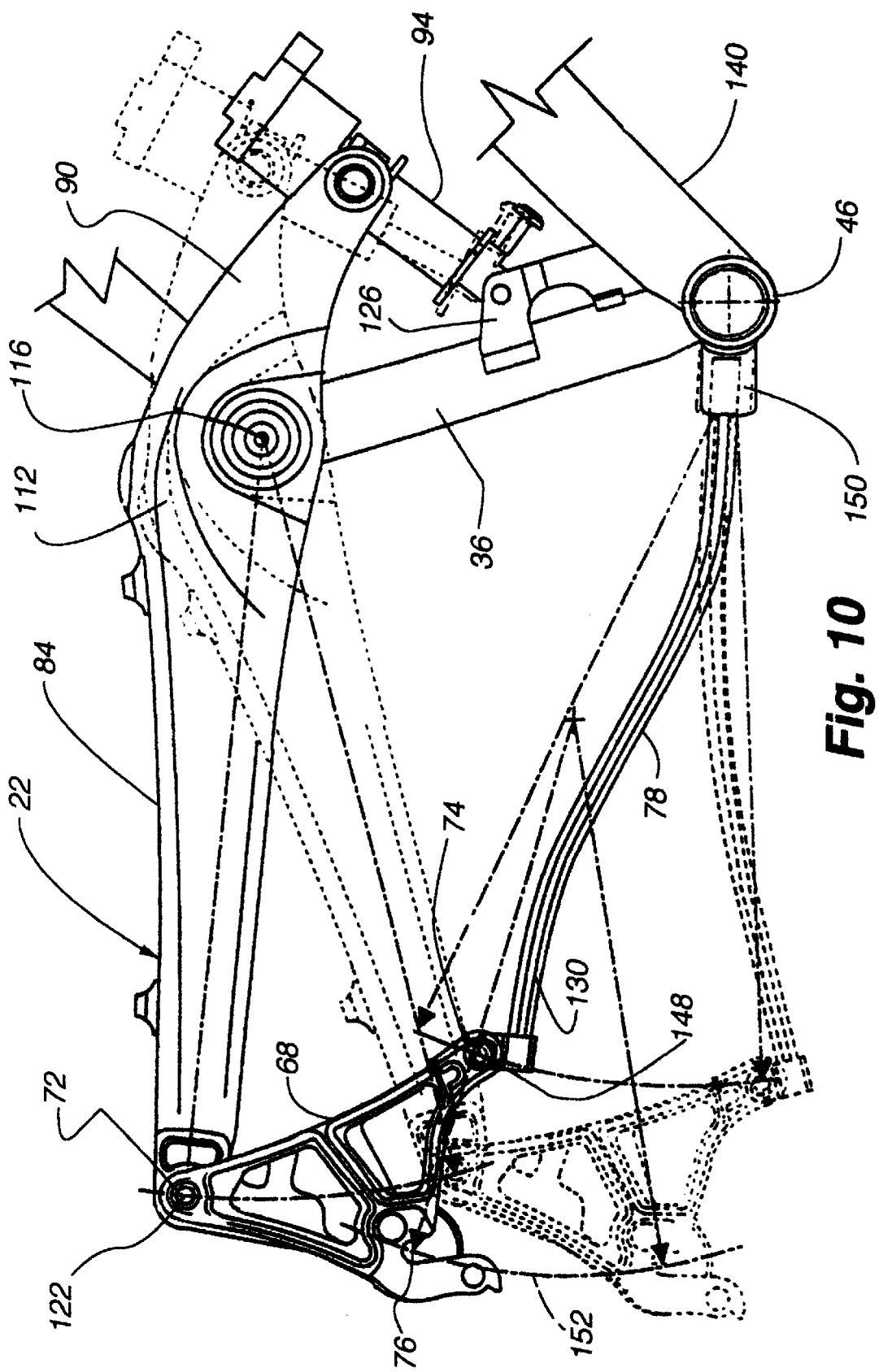
FIG. 10 is an enlarged side elevation of the rear suspension including the flexible chain stay showing the rear suspension in the compressed position in solid line and the rear suspension in uncompressed position in dash.

As viewed from the right side of a bicycle including the flexible chain stay of the present invention, such as in FIG. 10, when the rear suspension is actuated by an impact, the force is applied through the axle attachment point 60 to the drop link 68. Generally, the drop link 68 is moved upwardly, which causes the chain stay 78 to flex in a clockwise direction about the chain stay attachment point 150, and the seat stay 84 to rotate in a clockwise direction about the first pivot point 116. The movement of the chain stay 78 and seat stay 84 causes the drop link 68 to rotate counter-clockwise about itself as it traces the axle path 152. The amount that the drop link 68 rotates, and the particular movement of the axle attachment point 60 during the movement of the drop link is determined by the particular dimensions of the links between the pivot points 116, 122, 148 and the chain stay attachment point in the rear suspension system.

Continuing with FIG. 10, as the suspension moves from the uncompressed (in dash) to the compressed position (in solid), the damping member 94 is actuated by the seat stay 84 and resists the movement. In addition, the spring characteristic inherent in the flexing of the chain stay 78 resists the upward movement of the suspension to provide additional shock absorption. The energy stored in the chain stay 78 due to its flexing is then released to move the rear suspension downwardly from the compressed position to the uncompressed position. The suspension 22 is limited in moving substantially past the uncompressed position downwardly by the damping member 94.

When the chain stay 78 flexes upwardly, it develops a double-curve due to the fixed front end and the off-set pivot structure of the chain stay end boss 140 connecting the rear end of each leg 130 to the respective drop link 68, 70. The spring constant (stiffness) of the flexible chain stay 78 (in rotational, vertical and horizontal movement directions) can be modified by changing its material, its cross section shape (oval, square, rectangular, circular, etc.), or the length of the flexible portion of the legs (i.e., the front, or other portion, of the chain stay can be relatively stiff or even rigid). This would typically require that the chain stay be removed and replaced with the another chain stay 78 having the desired flexing characteristics.

Figure 12:
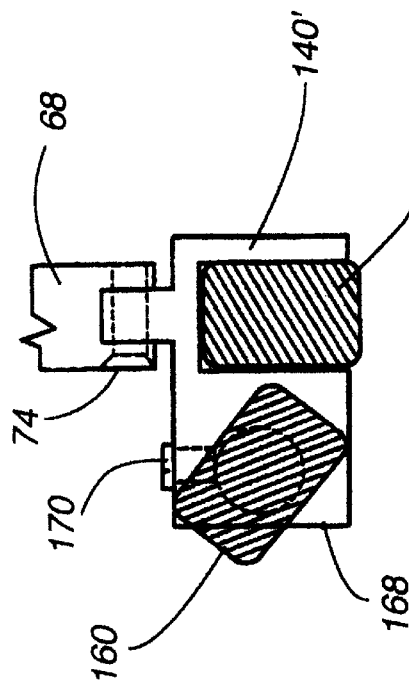
FIG. 12 is a section taken along line 12—12 of FIG. 11, showing the adjustment mechanism in a first position.

In addition, stiffness adjusting structure 158 can be added to a flexible chain stay 78 to allow for the adjustment of the flexing characteristics without changing the actual chain stay. See FIGS. 11–15. One embodiment of the means for varying the stiffness of the chain stay 78 includes a rotatable auxiliary rod 160 mounted at its ends to the chain stay 78, and positioned along side each leg of the chain stay. The rod would extend a significant length along each leg 130. The auxiliary rod 160 has a cross sectional shape selected to be stiffer in one rotational position (FIG. 12) than another (such as a rectangular or oval cross sectional shape). See FIG. 14. The auxiliary rod 160 is thus rotated so the cross sectional shape is oriented in the desired direction, and fixed in that position, to provide the additional stiffness characteristics.

The stiffness adjusting structure 158 (identical on each leg 130) is shown in FIGS. 11–15. The auxiliary rod 160 has a front end 162 rotatably received in a first boss 164, and a rear end 166 rotatably received in a second boss 168. A jam screw 170 (FIG. 15) is positioned in each boss to hold the auxiliary rod in the desired rotational position as selected by the user. The jam screw 170 loosens to allow the rod 160 to turn in the first and second bosses. The rotational position of the rod is thus fixed in the bosses by the jam screw, and thus it is fixed relative to the chain stay 78 also.

Figure 13:
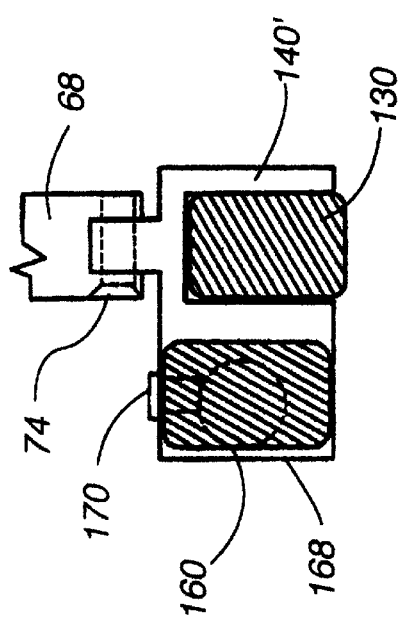
FIG. 13 is a representational section view similar to FIG. 12, wherein the adjustment mechanism is rotated from the first position.
Figure 15:
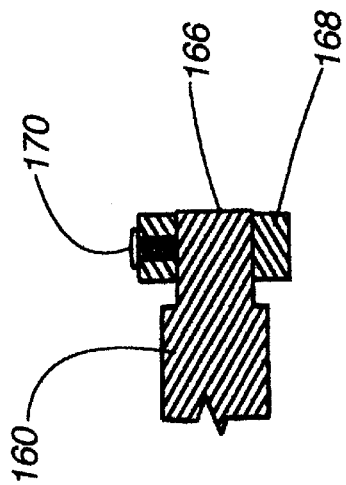
FIG. 15 is a section taken along line 15—15 of FIG. 14, and shows the attachment of the rear end of the adjustment mechanism, which is identical for the front end of the adjustment mechanism.
Figure 14:
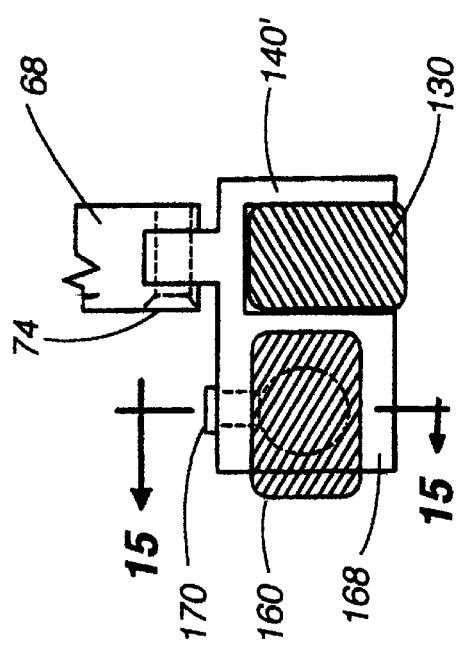
FIG. 14 is a representational section view similar to FIG. 12, wherein the adjustment mechanism is rotated from the first position to a second position.

The rod 160 is shown as having a rectangular cross section between the front 182 and rear 166 ends. When the long dimension is oriented vertically, as in FIG. 12, the rod enhances the stiffness of the legs 130 a relatively larger amount than when the long dimension is oriented horizontally, as in FIG. 14. FIG. 13 shows the rod in an intermediate position. While the jam screw works, other means of releasably fixing the rotation of the rod are acceptable. The front boss 164 can be integrally formed with the bottom bracket 46. The rear boss 168 can be integrally formed with the chain stay end boss 140'.

The instant invention includes a four-bar rear suspension 22 with three rigid members (links) and one flexible member, all attached by three pivot points and one fixed junction. The flexible member is fixed at one end to one of the rigid links, and pivotally attached at its other end to another of the rigid links. The third rigid link is pivotally attached at each opposing end to one of the other rigid links. The flexible member, the chain stay, flexes upwardly and stores energy when the suspension is compressed, and rebounds downwardly and expends energy when uncompressed from the compressed position. The damper acts to further provide energy absorbency. The flexible member has a spring rate that can be modified by the structure of the flexible member itself, or it can be modified by adding on an adjustable stiffener, as described above.

An important benefit of the present invention is that it allows for a relatively lighter bicycle. The flexible chain stay acts to absorb more energy than chain stays of available rear suspensions, and thus allows the seat stay to be designed more weight-efficiently since it does not have to absorb as much energy. Also, the strong bottom bracket structure of the frame is the anchor point for the flexible chain stay, thus allowing the front triangle of the frame to be designed more weight-efficiently. Further, the damper does not require a heavy coil spring. Thus, the combination of the composite chain stay, lighter seat stay, lighter front triangle and no coil spring provides significant weight saving.

Presently preferred embodiments of the present invention and many of its improvements have been described with a degree of particularity. The previous description is of a preferred example for implementing the invention, and the scope of the invention should not necessarily be limited by this description. The scope of the present invention is defined by the scope of the following claims.

We claim:

1. A rear suspension bicycle comprising:
   a rear wheel with an axle;
   a frame including a seat tube and a down tube having a top and bottom ends;
   a pair of drop link members, one for either side of the rear wheel, each having a top attachment point and a bottom attachment point, and an axle attachment point for receiving said axle;
   a seat stay assembly having a front end and a rear end, and having a front pivot point adjacent the front end for pivotal attachment to the down tube defining a first pivot point, and a pair of rear pivot points, each for pivotal attachment to the top attachment point of one of said drop link members, forming together the second pivot point;
   a chain stay assembly having a front end and a rear end, and defining a fixed front attachment point at said front end, and a pair of rear pivot points at said rear end, said fixed front attachment point being adjacent to the bottom end of the seat tube, and said pair of rear pivot points each for pivotal attachment to the bottom attachment point of one of said drop link members, forming together the third pivot point; and
   wherein when said rear wheel is moved upwardly with respect to the frame, said axle traces a curvilinear axle path generally upwardly.

2. A suspension bicycle as defined in claim 1, further comprising a damping member mounted between the seat stay assembly and the frame.

3. A suspension bicycle as defined in claim 2, wherein said damping member is a rotary damping member.

4. A suspension bicycle as defined in claim 1, wherein each of said rear ends of said chain stay being for offset pivotal attachment to the bottom attachment point the corresponding one of said drop link members.

5. A suspension bicycle as defined in claim 1, wherein said chain stay defines flexible rearwardly extending legs.

6. A suspension bicycle as defined in claim 5, wherein each of said rearwardly extending legs has increasing vertical stiffness along its length.

7. A suspension bicycle as defined in claim 5, wherein each of said rearwardly extending legs has variable vertical stiffness along its length.

8. A suspension bicycle as defined in claim 2, wherein said damping member is positioned forwardly of said seat tube.

9. A suspension bicycle as defined in claim 2, wherein said damping element is positioned rearwardly of said seat tube.

10. A suspension bicycle as defined in claim 1, wherein:

said top attachment point is forwardly and upwardly of said axle attachment point;

said bottom attachment point is forwardly and downwardly of said axle attachment point; and said bottom attachment point is forwardly of said top attachment point.

11. A suspension bicycle as defined in claim 1, wherein said drop link is a substantially triangular body with the bottom attachment point, top attachment point, and axle attachment point substantially forming the respective tips of the triangle.

12. A suspension bicycle as defined in claim 5, wherein each of said rearwardly extending legs has constant vertical stiffness along their respective length.

13. A suspension bicycle as defined in claim 5, wherein said chain stay includes a means for adjusting the vertical stiffness along its length.

* * * * *